A. J. McDONALD.
ANCHOR BOLT.
APPLICATION FILED OCT. 17, 1916.

1,242,569.

Patented Oct. 9, 1917.

WITNESSES
L. M. Collins.
J. M. Geoghegan.

INVENTOR
Alexander J. McDonald,
By J. N. Cooke,
Attorney.

UNITED STATES PATENT OFFICE.

ALEXANDER J. McDONALD, OF PITTSBURGH, PENNSYLVANIA.

ANCHOR-BOLT.

1,242,569.  Specification of Letters Patent.  Patented Oct. 9, 1917.

Application filed October 17, 1916. Serial No. 126,111.

*To all whom it may concern:*

Be it known that I, ALEXANDER J. MC-DONALD, a citizen of the United States, and a resident of Pittsburgh, in the county of Allegheny and State of Pennsylvania, have invented a new and useful Improvement in Anchor-Bolts; and I do hereby declare the following to be a full, clear, and exact description thereof.

My invention pertains to anchor bolts, and relates especially to anchor bolts for insertion into an aperture in a wall so as to permit the bolt normally to withstand any tendency to separate it from the wall, but allow the bolt to be withdrawn from the wall, when such withdrawal is desired. An important use of my improved anchor bolt occurs in connection with the manholes which are provided for permitting access to be had to electric conductors and the like. In such manholes, it is usual to provide a plurality of bolts, for the reception of a snatch-block, or the like, when it is desired to haul a conductor through a conduit. Heretofore these bolts have usually been built permanently into the wall of the manhole, with the result that they are often found to be in the way, and to restrict comfortable work in these confined spaces. Moreover, these bolts are used infrequently; and the provision of a number of permanent bolts is, therefore, an unnecessary waste of material, and of labor in building. It is an object of my invention to provide a simple and easily produced device which may be readily attached and detached from the wall, and which, when attached, will withstand all reasonable strains placed upon it. It is another object of my invention to provide such a device, which will be easy to use and may, if desired, be made a part of a snatch-block, or the like. And other and further objects of the invention will appear from the following specification, taken in connection with the appended claims.

By way of example, I have shown in the accompanying drawing and described in the following specification, one form of anchor bolt constructed in accordance with my invention. I wish it understood, however, that the invention may be embodied in other forms, and that changes may be made in the form described and shown, without exceeding the scope thereof, as defined in the appended claims.

In the drawing.

Like reference characters refer to like parts throughout the following specification and the several figures of the accompanying drawing.

Figure 1:
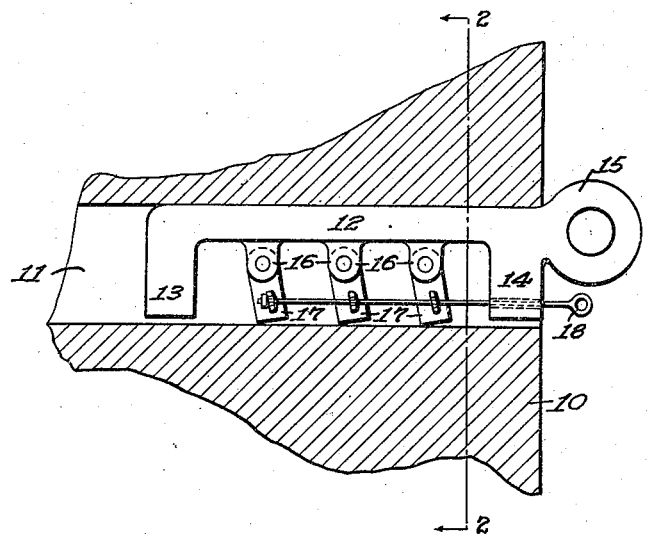
Figure 1 is a side elevation of an anchor bolt constructed in accordance with my invention, showing the same in operated relation with respect to a wall.
Figure 2:
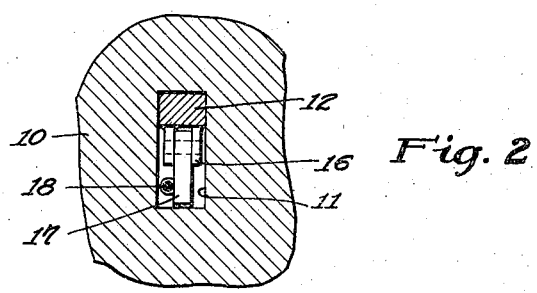
Fig. 2 is a section on the line 2—2 of Fig. 1, looking in the direction of the arrows.
Figure 3:
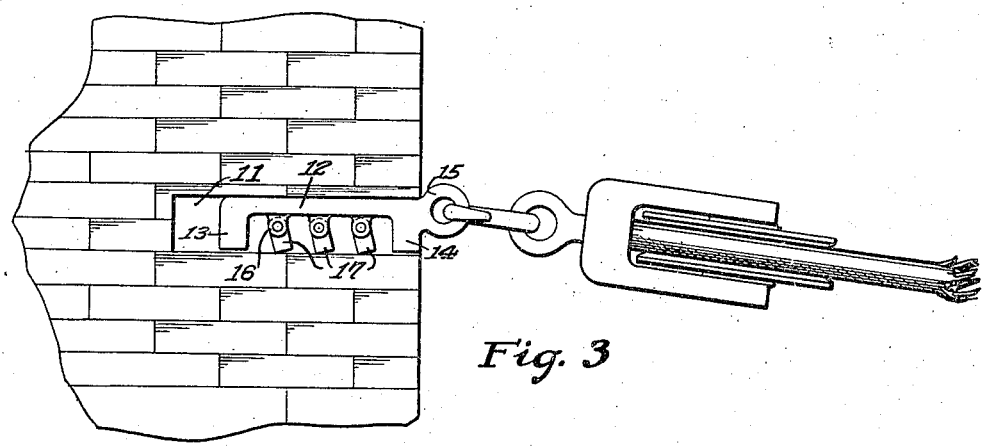
Fig. 3 is a side view showing the manner of use of my improved anchor bolt.

Referring now to the drawing, 10 indicates a wall, which may be the wall of a street manhole, or the like. In the wall is formed a recess 11, of rectangular cross section, for receiving the anchor bolt. The anchor bolt comprises a body portion 12, having front and rear legs 13 and 14, and having, at its front end, an eye 15, to which a snatch-block or the like may readily be attached.

A plurality of pairs of ears 16 extend downwardly from the body portion 12; and between each pair of ears there is pivoted a dog 17. Each of the dogs 17 is long enough to permit it to extend slightly beyond the ends of the legs 13 and 14; so that, when the device is thrust into the wall recess 11, the dog 17 will naturally move into a slightly tilted position.

When the device is thrust into the wall aperture 11, the dog 17 will engage against the lower face of said aperture, and will prevent withdrawal of the device; since the tendency of an effort to withdraw the device would be to move the dogs 17 into their vertical position, whereby the top of the member 12 would be forced firmly against the upper face of the recess 11. A toggle relation is thereby presented, which prevents the device from being pulled out from the aperture in the wall, by longitudinal pressure.

In order to permit the device to be withdrawn from the wall, when such withdrawal is desired, I provide a pin 18, which passes freely through a hole in the front leg 14, and is attached to each of the dogs 17. When it is desired to remove the device, it is only necessary to pull upon the pin 18, which releases the dogs 17 from their engaging relation, and permits the device easily to be pulled out.

In one of the important practical uses of my improved anchor bolt, the man-holes will be formed with a plurality of recesses, such as 11, such recesses being located at all the points where it might be desirable to attach a snatch-block, such as 19, or the like. It will then only be necessary for the operator to carry with him one anchor bolt; since he can, in a moment's time, insert this anchor bolt in whichever of the wall recesses will give him the position which he requires.

Having thus fully described my invention what I claim as new and desire to secure by Letters Patent is:

1. The combination with a wall having therein an opening of substantially rectangular cross section, of an anchor bolt cooperating with said wall at the opening thereof, said anchor bolt comprising a body member, a pair of downwardly extending legs, one at each end of said body member, said legs being of a size to substantially fit in said opening, and a plurality of dogs, pivoted to said body member between said legs, and disposed so as to separately engage a wall of said opening and be tilted when said anchor bolt is inserted in said opening, whereby said dogs, by their engagement with the wall of said opening, prevent withdrawal of said anchor bolt from said opening.

2. The combination with a wall having therein an opening of an anchor bolt cooperating with said wall at said opening, said anchor bolt comprising a body member having a pair of downwardly extending legs, one at each end thereof, a plurality of dogs pivoted to said body member between said legs, said dogs being disposed separately to engage the wall of said opening, and be tilted when said anchor is inserted in said opening, and a pin passing through one of said legs and attached to each of said dogs, whereby, by moving said pin, said dogs may be released from their engagement with the wall of said opening.

3. An anchor bolt comprising a body member having a downwardly extending spacing portion, a pivoted dog extending beyond said leg, and means secured to said dog and passing through said spacing portion for manually swinging said dog about its pivot, for the purposes set forth.

4. An anchor bolt comprising a body member, a plurality of engaging dogs pivoted to said body member, a spacing portion and means, attached to all of said dogs, and passing through said spacing portion for manually swinging said dogs about their pivots, for the purposes set forth.

5. An anchor bolt comprising a body member, downwardly extending spacing portions, a dog pivoted to the bottom side of said body portion and extending beyond said spacing portions.

6. An anchor bolt comprising a body portion, a downwardly extending spacing leg, ears projecting from the bottom of said body portion, a dog pivoted between said ears and extending below said spacing leg for the purposes set forth.

7. An anchor bolt comprising a body portion, a downwardly extending spacing portion, ears projecting from the bottom of said body portion, a dog pivoted between said ears, and extending below said spacing portion, and means connected with said dog and passing through said spacing portion for swinging said dog about its pivot.

8. An anchor bolt comprising a body portion, spacing means on said body portion, a gripping dog pivoted on the under side of said body portion and adapted to extend beyond said spacing means, and means attached to said dog and passing through said spacing means, for manually swinging said dog about its pivot, for the purposes set forth.

9. As a new article of manufacture, an anchor bolt comprising a rigid body portion, an eye on the forward end thereof, a gripping dog pivoted to the under side of said body portion, and means secured to said gripping dog adapted to be manually operated to swing said dog on its pivot and thereby release it.

In testimony whereof I, the said ALEXANDER J. McDONALD, have hereunto set my hand.

ALEXANDER J. McDONALD.

Witnesses:
A. D. P. MILLER,
J. N. COOKE.

Copies of this patent may be obtained for five cents each, by addressing the "Commissioner of Patents, Washington, D. C."